United States Patent [19]

Uemachi et al.

[11] Patent Number: 5,348,819
[45] Date of Patent: Sep. 20, 1994

[54] REVERSIBLE ELECTRODE

[75] Inventors: Hiroshi Uemachi; Yoshiko Sato; Tadashi Sotomura; Kenichi Takeyama, all of Osaka, Japan

[73] Assignee: Matsushita Electric Industrial Co., Ltd., Osaka, Japan

[21] Appl. No.: 55,858

[22] Filed: Apr. 30, 1993

[30] Foreign Application Priority Data

May 7, 1992 [JP] Japan ................... 4-114515

[51] Int. Cl.$^5$ ............................... H01M 4/60
[52] U.S. Cl. ......................... 429/213; 429/104
[58] Field of Search .............. 429/104, 213; 568/25, 568/26, 67

[56] References Cited

U.S. PATENT DOCUMENTS

| | | | |
|---|---|---|---|
| 3,423,374 | 1/1969 | Jones et al. | 568/26 X |
| 4,833,048 | 5/1989 | DeJonghe et al. | 429/213 |
| 4,917,974 | 4/1990 | DeJonghe et al. | 429/104 |

FOREIGN PATENT DOCUMENTS

| | | |
|---|---|---|
| 0415856 | 7/1990 | European Pat. Off. . |
| 242909 | 2/1987 | Fed. Rep. of Germany . |
| 61-126066 | 6/1986 | Japan .................... 568/25 |
| 393169 | 4/1991 | Japan . |
| WO8703734 | 7/1987 | PCT Int'l Appl. . |

OTHER PUBLICATIONS

Search Report for European appl. 93107485.0. mailed Sep. 3, 1993.
K. Naoi et al. The 31st Battery Symposium in Japan, Nov. 12–14, 1990, pp. 31–32 1A14 "Electrochemical Reaction of Organodisulfide Compounds; Application to Energy Storage Material".
H. J. Barber et al. Journal of the Chemical Society, London. 1928. pp. 1141–1149, CXLV. "Cyclic Disulphides Derived From Diphenyl".
F. Wudl et al. Journal of the Americal Chemical Society, Jan. 1976 pp. 252–254. "Dehydrotetrathianaphthazarin".
R. C. Haddon et al. Journal of the American Chemical Society. Jul 1978, pp.4612–4614, "Electron Spin Resonance Studies of Sulfur–Based Donor Heterocycles. 33S Couplings".
A. Zweig et al. The Journal of Organic Chemistry, vol. 30, No. 12, pp. 3997–4001, "Naphthalene 1,8–Disulfide". (Dec. 1965).

*Primary Examiner*—Stephen Kalafut
*Attorney, Agent, or Firm*—Renner, Otto, Boisselle & Sklar

[57] ABSTRACT

A reversible electrode of the present invention is provided, which includes an organic sulfur aromatic compound represented by the formula $R(SX)_y$ (where R is an aromatic group, S is sulfur, X is a metal atom or hydrogen, and y is an integer of 2 or more) as a component so as to utilize the reversible electrochemical oxidation-reduction of sulfur atoms of the organic sulfur aromatic compound for an electrode reaction. Moreover, according to the present invention, a method for producing the reversible electrode is provided.

12 Claims, 1 Drawing Sheet

A ---- EXAMPLE 1

B ---- EXAMPLE 2

C ---- COMPARATIVE EXAMPLE

REVERSIBLE ELECTRODE

BACKGROUND OF THE INVENTION

1. Field of the Invention:

The present invention relates to a reversible electrode used for electrochemical devices such as a battery, an electrochromic display, a sensor, and a memory.

2. Description of the Related Art:

An electrode material used for a lightweight battery with a high energy density, an electrochromic display with a large area, or a biochemical sensor using a microelectrode is required to be lightweight, to have a high theoretical energy density, and to be excellent in durability.

A conducting polymer electrode has extensively been studied since Shirakawa et al. discovered conducting polyacetylene in 1971. This is because the use of a conducting polymer enables a battery which is lightweight and has a high energy density. Polyacetylene is, however, impractical in use due to its chemical instability with respect to moisture and oxygen in the air. Subsequently, since $\pi$-electron conjugated conducting polymers, which are chemically stable, such as polyaniline, polypyrrol, and polythiophene were discovered, a lithium secondary battery and the like using these electrode materials as a cathode have been developed. In addition to these conducting polymers, some electrode materials which are lightweight and have a high energy density, such as sulfur and a compound containing sulfur have been studied.

An electrode using a conducting polymer as a cathode incorporates anions in an electrolyte as well as cations when subjected to an electrode reaction. Thus, the electrolyte acts as a medium for moving ions and participates in the cell reaction simultaneously as a cathode active material. Because of this, as the electrode reaction proceeds, the electrolyte decreases in amount, requiring that an electrolyte in an amount enough to compensate for a battery's capacity should be supplied in a battery. As a result, the energy density of the battery is decreased. A lithium secondary battery using a conducting polymer as a cathode has an energy density of 20 to 50 Wh/kg, i.e., about ½ of that of an ordinary secondary battery such as a nickel-cadmium battery or a lead storage battery. Moreover, for example, a sodium-sulfur battery using sulfur as a cathode is slow to perform an electrode reaction at room temperature, so that this type of battery is used only under a high temperature condition where the electrode reaction proceeds relatively rapidly. Japanese Laid-Open Patent Publication No. 3-93169 discloses a solid electrochemical battery which recharges itself (generator), using an organic sulfur compound such as dithiouracil as a cathode. This solid electrochemical battery does not have a sufficiently high electrode reaction rate at room temperature.

SUMMARY OF THE INVENTION

A reversible electrode of the present invention includes an organic sulfur aromatic compound represented by the formula $R(SX)_y$ (where R is an aromatic group, S is sulfur, X is a metal atom or hydrogen, and y is an integer of 2 or more) as a main component so as to utilize the reversible electrochemical oxidation-reduction of sulfur atoms of the organic sulfur aromatic compound for an electrode reaction.

According to another aspect of the present invention, a method for producing a reversible electrode including an organic sulfur aromatic compound represented by the formula $R(SX)_y$ (where R is an aromatic group, S is sulfur, X is a metal atom or hydrogen, and y is an integer of 2 or more) as a main component so as to utilize the reversible electrochemical oxidation-reduction of sulfur atoms of the organic sulfur aromatic compound for an electrode reaction, includes the steps of:

preparing an organic sulfur aromatic compound which is an oxidized form of the organic sulfur aromatic compound represented by the formula $R(SX)_y$ and has at least one disulfide bond; and forming an electrode from the organic sulfur aromatic compound having the disulfide bond and an electron-conducting material.

Thus, the invention described herein makes possible the advantage of providing a reversible electrode which is lightweight and has a high theoretical energy density.

This and other advantages of the present invention will become apparent to those skilled in the art upon reading and understanding the following detailed description with reference to the accompanying figures.

DESCRIPTION OF THE PREFERRED EMBODIMENTS

Figure 1:
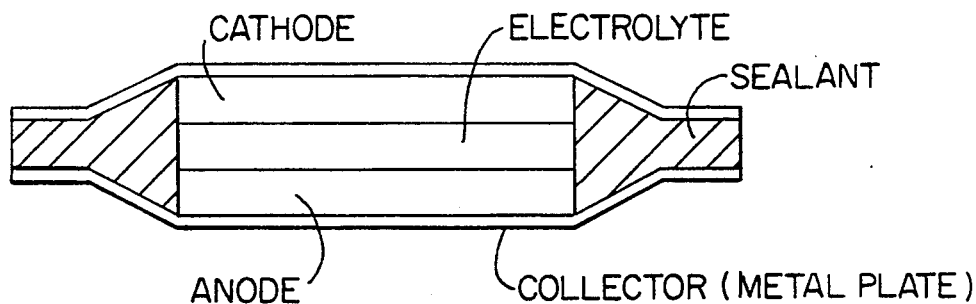
FIG. 1 is a cross-sectional view of a battery using a reversible electrode of Examples of the present invention or of Comparative Example.

A reversible electrode of the present invention includes an organic sulfur aromatic compound represented by the formula $R(SX)_y$ (where R is an aromatic group, S is sulfur, X is a metal atom or hydrogen and y is an integer of 2 or more,) as a main component so as to utilize a reversible electrochemical oxidization reduction of sulfur atoms of the organic sulfur aromatic compound.

According to another aspect of the present invention, a method for producing a reversible electrode including an organic sulfur aromatic compound represented by the formula $R(SX)_y$ (where R is an aromatic group, S is sulfur, X is a metal atom or hydrogen, and y is an integer of 2 or more) as a main component so as to utilize a reversible electrochemical oxidation-reduction of sulfur atoms of the organic sulfur aromatic compound, includes the steps of:

preparing an organic sulfur aromatic compound which is an oxidized form of the organic sulfur aromatic compound represented by the formula $R(SX)_y$ and which has at least one disulfide bond; and forming an electrode by using the organic sulfur aromatic compound and an electron-conducting material.

In the above-mentioned formula $R(SX)_y$, examples of the aromatic group R include a phenylene group, a biphenylene group, a naphthalene group, an anthrazenetetrayl group, a tetracenetetrayl group, a phenanthridinyl group, and a benzisothiazoledinyl group. In particular, a naphthalene group and a tetracenetetrayl group are preferred. Examples of the metal atom represented by X include lithium, sodium, and potassium. In particular, lithium is preferred.

As described above, the organic sulfur aromatic compound has at least two SX groups. Preferably, the SX groups are located in the position where the SX groups can be oxidized to form a ring structure containing five or six elements including a sulfur atom as a ring member.

Preferably, examples of the organic sulfur aromatic compound include 1,8-naphthalenedithiol, 5,6,11,12-tetracenetetrathiol, 2,2'-biphenylenedithiol, 1,4,5,8-naphthalenetetrathiol, and metallic salts thereof.

A sulfur atom contained in one molecule of the organic sulfur compound is electrochemically oxidized to form a disulfide bond with a sulfur atom contained in the same molecule in another molecule of the compound, thereby forming a ring structure. For example, 1,4,5,8-naphthalenetetrathiol is electrolytically oxidized to form a disulfide bond within a molecule to form a ring structure in the following manner:

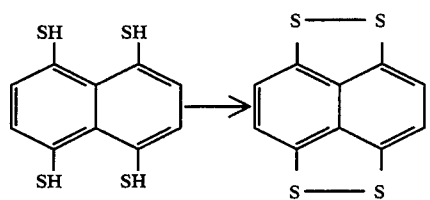

For example, 1,8-naphthalene dithiol is electrolytically oxidized to form a disulfide bond with another molecule in the following way, thereby forming a dimer with a ring structure.

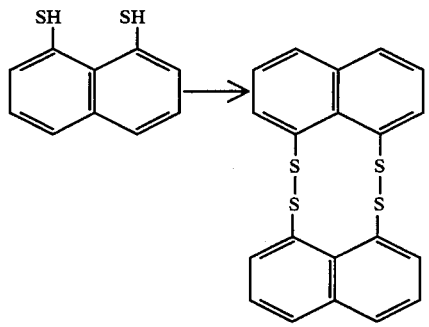

Those compounds having the ring structures return to original thiol type compounds when they are electrolytically reduced.

As described above, the organic aromatic compounds exist in a reduced form or in an oxidized form. The organic sulfur aromatic compounds become reduced forms in which X is a metal atom, when they are electrochemically reduced in the presence of electrolyte compounds. The organic sulfur aromatic compounds become oxidized form having at least one disulfide bond within a molecule or between molecules, when they are electrochemically oxidized. As the electrolyte compound, a conventional electrolyte can be used. Examples of the electrolyte include lithium perchlorate (LiClO4), lithium trifluoromethanesulfonate (LiCF3SO3), etc.

Examples of the oxidized form of the organic sulfur aromatic compound include 1,8-dithianaphthalene, 5,6,11,12-tetrathiatetracene, 2,2'-biphenylenedisulfide, and 1,4,5,8-tetrathionaphthalene.

Preferably, the oxidized form of the organic sulfur aromatic compound is used as an electrode material when electrodes are prepared.

The organic sulfur aromatic compound does not have electron-conductivity, so that the compound is combined with an electron-conducting material to form an electrode. Examples of the electron-conducting material include various kinds of metallic materials and semiconductor materials, electron-conducting materials of oxides and sulfides, carbon or graphite materials, and conducting polymers. Examples of the conducting polymer include polyaniline, polypyrrol, polyacetylene, and polythiophene. These polymers can be used in the form of a particle, a fiber, a fibril, and a whisker. In particular, a minute fibril-shaped or whisker-shaped polymer is preferred. The organic sulfur aromatic compound and the conducting material can be mixed in an arbitrary ratio in accordance with various purposes. The organic sulfur aromatic compound and the conducting material can be mixed in a weight ratio of 90:10 to 10:90.

The organic sulfur aromatic compound, the electron conducting material, and if desired a polymer electrolyte material are mixed and formed into, for example, a predetermined shape such as a film, whereby an electrode can be formed. Alternatively, the electron-conducting material and the polymer electrolyte material are previously formed into a porous film, and the organic sulfur aromatic compound is carried on the porous film to form an electrode. Moreover, in the case where a conducting polymer is used as the electron-conducting material, the organic sulfur aromatic compound is added during the preparation of the conducting polymer from a monomer by polymerization, and the polymer thus obtained is used for forming an electrode. The electrode thus obtained is used as a cathode and combined with, for example, an anode formed of lithium to form a secondary battery.

When the sulfur atoms are under a reduced condition, the organic sulfur aromatic compound has a resonating structure, in which negative charges on sulfur atoms are not localized, and is stabilized. Thus, a disulfide bond is readily cleaved during the electrochemical reduction. Moreover, since at least one pair of the SX groups of the organic sulfur aromatic compound is located in a position where the SX groups can be oxidized to form a ring structure containing five or six elements including sulfur, a disulfide bond is more rapidly formed, compared with the case where the SX groups are present between different molecules during electrochemical oxidation. In this way, the electrochemical oxidation-reduction reaction of sulfur proceeds at sufficiently high speed even at room temperature. Thus, a reversible electrode which is lightweight and has a high theoretical energy density can be obtained.

EXAMPLES

Hereinafter, the present invention will be described by way of illustrating examples with reference to the drawings.

EXAMPLE 1

Synthesis of 1,8-dithianaphthalene:

First, 60 g (0.27 mol) of 1-aminonaphthalene-8-sulfonic acid was kneaded with water in a mortar to form a paste. The paste thus obtained was transferred to a flask. Then, 200 ml of water and 20 ml of sulfuric acid were added to the paste and thoroughly stirred. With stirring, 100 ml of a solution of sodium nitrate containing 30 g (0.43 mol) of sodium nitrate was added over about 30 minutes. The resulting mixture was allowed to react at a temperature in the range of $-10°$ C. to $-15°$ C. for about one hour. The reaction solution thus obtained was filtrated to obtain a solid. The solid was washed with 100 ml of cold water to obtain a diazonium salt. To the diazonium salt, 200 ml of a solution of sodium disulfide was added so that the diazonium salt was dissolved therein and allowed to stand for 3 hours at room temperature. After that, the mixture was titrated with chlorine to adjust pH to 7.5 for the remaining sulfur. Thus, 45 g of 8,8'-dithiodi-1-naphthalene sodium sulfate was obtained.

The salt thus obtained was put in cold water and 30 g (0.14 mol) of phosphorus pentachloride was slowly added thereto, whereby the mixture was reacted. The mixture was allowed to stand for 30 minutes until the solution temperature returned to room temperature, after which the reaction solution was filtrated to obtain a reaction product. Then, the reaction product was washed with benzene until it was decolorized, and the washed filtrate was collected. The filtrate was concentrated to obtain naphtho[1,8-c,d]-1,2-dithiol-1,1-dioxide. The concentrated solution was recrystallized to obtain 16 g of crystal. This 16 g of crystal was placed in hydrochloric acid to which zinc powders were added and allowed to react for one hour. Thus, 10 g of 1,8-dithianaphthalene was obtained.

Formation of a composite electrode made of 1,8-dithianaphthalene and polyaniline:

First, 3.9 g of $LiCF_3SO_3$, 11.5 g of sulfolane, and 7.9 g of ethylene carbonate were mixed. Then, 3.0 g of acrylonitrile/methylacrylonitrile copolymer powders (manufactured by Toyobo Co., Ltd.) were dissolved in the thus obtained solution. To the resulting solution, 5 g of acetonitrile was added to obtain a gel electrolyte solution. The gel electrolyte solution was cast onto a glass plate and dried in vacuo at 60° C. for 2 hours to obtain a gel electrolyte film (SPE) with a thickness of 100 $\mu$m and an ion conductivity of $6 \times 10^{-4}$ S/cm.

Separately, the above-mentioned gel electrolyte solution, polyaniline (PAn) powders, and 1,8-dithianaphthalene were mixed in a weight ratio of 64:7:29 and stirred to obtain 1,8-dithianaphthalene composite electrode solution. The electrode solution thus obtained was cast onto a glass plate and dried in vacuo at 60° C. for 2 hours to obtain a 1,8-dithianaphthalene composite cathode film with a thickness of 170 $\mu$m.

The above-mentioned gel electrolyte film (SPE) and the composite cathode film were cut into a circular shape with a diameter of 13 mm. The gel electrolyte film was sandwiched between the cathode film and an anode film. Here, as the anode film, a metallic lithium film with a diameter of 13 mm and a thickness of 70 $\mu$m was used. The electrolyte film sandwiched between the cathode film and the anode film was placed in a container made of a metal plate as shown in FIG. 1, and sealed with a sealant to obtain a test battery A.

The test battery A was subject to a constant voltage charging at 4.05 V until the charging current density decreases below 50 $\mu$A/cm$^2$. It was then discharged down to 1.5 V at a constant current density of 50 $\mu$A/cm$^2$. The weight energy density of the test battery A was calculated at 200 Wh/kg per 1 kg of cathode.

EXAMPLE 2

Synthesis of tetrathiatetracene:

First, 20 g of tetracene and 40 g of sulfur were put in a flask, and 500 ml of DMF was added to the flask. Then, the mixed solution was refluxed for 4 hours. The reaction solution was filtered while being warm to obtain a dark green solid. The solid was washed with benzene and dried in vacuo to obtain 29.3 g of tetrathiatetracene (yield: 94.8%).

Formation of a composite electrode made of tetrathiatetracene and carbon:

A gel electrolyte film (SPE) was obtained by the same method as that in Example 1. A gel electrolyte solution which was the same as that obtained in Example 1, 7% carbon fibers (0.039 g/cm$^3$, manufactured by Showa Denko Co., Ltd. ) powders, and tetrathiatetracene were mixed in a weight ratio of 64:7:29, and stirred to obtain a tetrathiatetracene composite electrode solution. This electrode solution was cast onto a glass plate and dried in vacuo at 60° C. for 2 hours to obtain a tetrathiatetracene composite cathode film with a thickness of 170 $\mu$m.

The above-mentioned gel electrolyte film (SPE) and the composite cathode film were cut into a circular shape with a diameter of 13 mm. Then, the gel electrolyte film was sandwiched between the cathode film and an anode film. Here, as the anode film, a metallic lithium film with a diameter of 13 mm and a thickness of 70 $\mu$m was used. The electrolyte film sandwiched between the cathode film and the anode film was placed in a container made of a metal plate as shown in FIG. 1, and sealed with a sealant to obtain a test battery B.

The test battery B was subject to the constant voltage charging at 4.05 V until the charging current density decreases below 50 $\mu$A/cm$^2$. It was then discharged down to 1.5 V at the constant current density of 50 $\mu$A/cm$^2$. The weight energy density of the test battery B was calculated at 240 Wh/kg per 1 kg of cathode.

Figure 2:
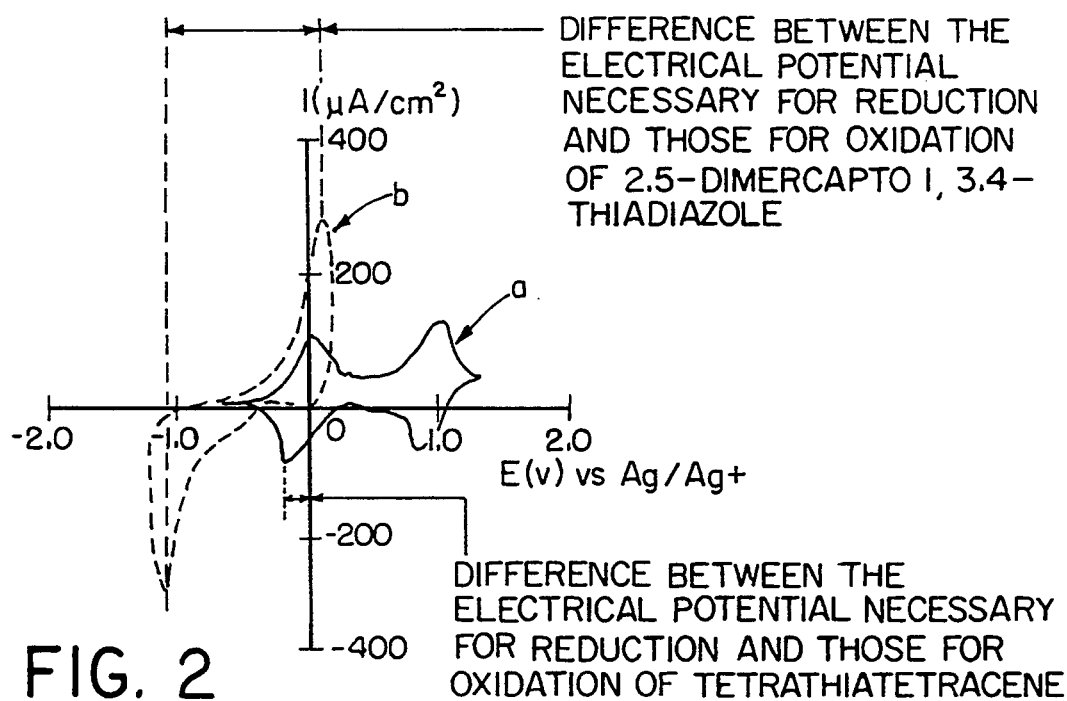
FIG. 2 is a cyclic voltammogram of 5,6,11,12-tetrathiatetracene and 2,5-dimercapto-1,3,4-thiadiazole.

FIG. 2 shows a cyclic voltammogram of tetrathiatetracene (represented by an arrow a) obtained in the present example and 2,5-dimercapto 1,3,4-thiadiazole (represented by an arrow b) as a comparative example. The dimercapto 1,3,4-thiadiazole is a kind of sulfur compound; however, it does not form a ring structure including a sulfur as a ring member.

In FIG. 2, the horizontal axis represents an electrical potential, and the vertical axis represents a current density. The cyclic voltammogram shows an oxidation-reduction response of an electrode formed of a specimen with respect to an Ag/Ag+ reference electrode. The electrical potential that gives maximal current density represents a necessary potential for reduction ($EI_{pred}$), and those that give minimal current density represent a necessary potential for oxidation ($EI_{pox}$). Thus, the oxidation-reduction rate is inversely proportional to the difference between the $EI_{pred}$ and the $EI_{pox}$.

As shown in FIG. 2, the difference between the $EI_{pox}$ and the $EI_{pred}$ of tetrathiatetracene represented by the arrow a is about 0.1 V; while the difference in electrical potential between the $EI_{pox}$ and the $EI_{pred}$ of the 2,5-dimercapto-1,3,4-thiadiazole represented by the arrow b is about 1 V.

COMPARATIVE EXAMPLE

A battery containing only polyaniline was formed in the same manner as that in Example 1 as follows:

A gel electrolyte film (SPE) was obtained by the same method as that in Example 1. A gel electrolyte solution which was the same as that obtained in Example 1 and polyaniline (PAn) powders were mixed in a weight ratio of 64:36 and stirred to obtain a composite electrode solution. The solution thus obtained was cast onto a glass plate and dried in vacuo at 60° C. for 2 hours to obtain a composite cathode film with a thickness of 170 $\mu$m.

The gel electrolyte film (SPE) and the composite cathode film were cut into a circular shape with a diameter of 13 mm. Then, the gel electrolyte film was sandwiched between the cathode film and an anode film. Here, as the anode film, a metallic lithium film with a diameter of 13 mm and a thickness of 70 $\mu$m was used. The electrolyte film sandwiched between the cathode film and the anode film was placed in a container made of a metal plate and sealed with a sealant to obtain a test battery C.

The test battery C was subject to the constant voltage charging at 4.05 V until the charging current density decreases below 50 $\mu$A/cm$^2$. It was then discharged down to 1.5 V at the constant current density of 50 $\mu$A/cm$^2$. The weight energy density of the test battery C was calculated at 50 Wh/kg per 1 kg of cathode. This revealed that the weight energy density of the test battery C was about ¼ of that of the test battery A in Example 1.

Figure 3:
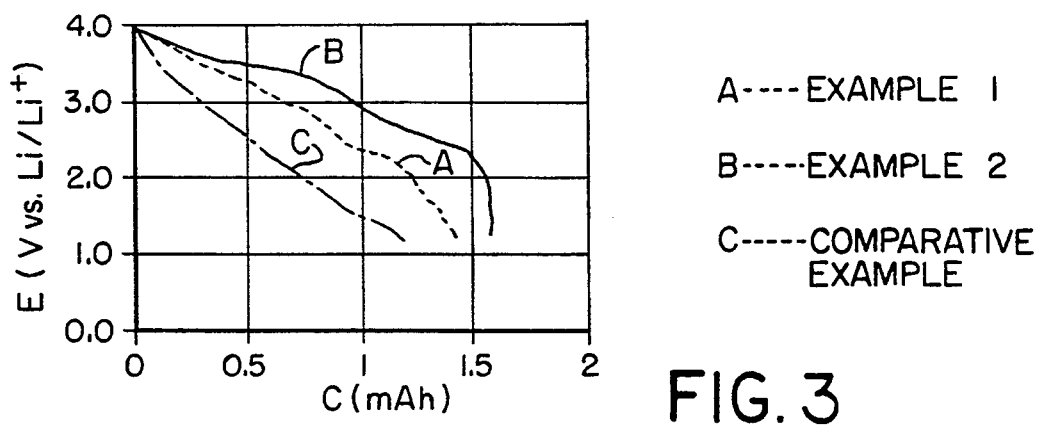
FIG. 3 is a graph showing capacity-voltage characteristics of batteries using the reversible electrodes of the Examples of the present invention and Comparative Example.

FIG. 3 shows discharging curves of the batteries A, B and C. The horizontal axis represents a battery capacity and the vertical axis represents a battery voltage. It is understood from FIG. 3 that the battery formed using the organic sulfur aromatic compound electrode had a high capacity.

As described above, a secondary battery which has a higher oxidation-reduction reaction rate, a higher energy density, and a longer life compared with a conventional example can be provided by using the reversible electrode of the present invention as a cathode and metallic lithium or the like as an anode.

In addition, an electrode used for electrochemical devices such as an electrochromic display with a large area and a biochemical sensor using a microelectrode, which is lightweight while having a high theoretical energy density and is excellent in durability, can be provided.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A reversible electrode comprising an organic sulfur aromatic compound represented by the formula R(SX)$_y$ (where R is an aromatic group, S is sulfur, X is a metal atom or hydrogen, and y is an integer of 2 or more) as a main component so as to utilize the reversible electrochemical oxidation-reduction of sulfur atoms of the organic sulfur aromatic compound for an electrode reaction; and an electrolyte.

2. A reversible electrode according to claim 1, wherein the organic sulfur aromatic compound has at least a pair of SX groups, and the SX groups are located in the position where the SX groups can be oxidized to form a ring structure containing five or six elements including a sulfur atom as a ring member.

3. A reversible electrode according to claim 2, wherein the organic sulfur aromatic compound is capable of forming at least one disulfide bond in a molecule thereof when subjected to electrochemical oxidation.

4. A reversible electrode according to claim 2, wherein a molecule of the organic sulfur aromatic compound is capable of forming a disulfide bond together with another molecule of the compound when subjected to electrochemical oxidation.

5. A method for producing a reversible electrode mainly comprising an organic sulfur aromatic compound represented by the formula R(SX)$_y$ (where R is an aromatic group, S is sulfur, X is a metal atom or hydrogen, and y is an integer of 2 or more) as a main component so as to utilize the reversible electrochemical oxidation-reduction of sulfur atoms of the organic sulfur aromatic compound, comprising the steps of:

preparing an organic sulfur aromatic compound which is an oxidized fore of the organic sulfur aromatic compound represented by the formula R(SX)$_y$ and which has at least one disulfide bond; and combining the organic sulfur aromatic compound having the disulfide bond and an electron-conducting material to form an electrode.

6. A method for producing a reversible electrode according to claim 5, wherein the organic sulfur aromatic compound has a ring structure containing five or six elements including a sulfur atom as a ring member.

7. A method according to claim 5, wherein the organic sulfur aromatic compound is at least one selected from the group consisting of 1,8-dithianaphthalene, 5,6,11,12-tetrathiatetracene, 2,2'-biphenylenedisulfide, and 1,4,5,8-tetrathionaphthalene.

8. A reversible electrode according to claim 1, wherein the organic sulfur aromatic compound is 1,8-naphthalenedithiol or the metallic salts thereof.

9. A reversible electrode according to claim 1, wherein the organic sulfur aromatic compound is 1,4,5,8-naphthalenetetrathiol or the metallic salts thereof.

10. A reversible electrode according to claim 1, wherein the organic sulfur aromatic compound is 5,6,11,12-tetracenetetrathiol or the metallic salts thereof.

11. A reversible electrode according to claim 1, wherein the organic sulfur aromatic compound is 2,2'-biphenylenedithiol or the metallic salts thereof.

12. The reversible electrode produced according to the method of claim 5.

* * * * *

UNITED STATES PATENT AND TRADEMARK OFFICE
CERTIFICATE OF CORRECTION

PATENT NO. : 5,348,819

DATED : September 20, 1994

INVENTOR(S) : Uemachi et al.

It is certified that error appears in the above-identified patent and that said Letters Patent is hereby corrected as shown below:

Claim 5, column 8, line 30, change "fore" to --form--.

Signed and Sealed this

Seventh Day of February, 1995

Attest:

BRUCE LEHMAN

Attesting Officer

Commissioner of Patents and Trademarks